United States Patent [19]

Niederer, Sr.

[11] Patent Number: 4,596,486

[45] Date of Patent: Jun. 24, 1986

[54] CABLE TERMINATION

[75] Inventor: Otto C. Niederer, Sr., Madison, Ohio

[73] Assignee: PMI Industries, Inc., Cleveland, Ohio

[21] Appl. No.: 542,717

[22] Filed: Oct. 17, 1983

[51] Int. Cl.[4] .......................... F16B 11/00; F04B 47/02
[52] U.S. Cl. ....................... 403/268; 403/275; 403/374; 403/368; 174/79; 24/115 M; 24/122.6
[58] Field of Search ............... 403/275, 268, 277, 368, 403/374, 373; 174/79; 24/115 L, 115 M, 136 L, 122.6

[56] References Cited

U.S. PATENT DOCUMENTS

| | | | |
|---|---|---|---|
| 1,408,212 | 2/1922 | Leinbach | 24/122.6 X |
| 2,434,152 | 1/1948 | Forry | 287/119 |
| 3,288,913 | 11/1966 | Maddux | 174/79 |
| 3,443,020 | 5/1969 | Loshigian | 174/101.5 |
| 3,468,569 | 9/1969 | Ballard et al. | 174/79 X |
| 3,573,346 | 4/1971 | Appleby | 174/79 X |
| 3,708,781 | 1/1973 | Trompeter | 339/177 R |
| 3,775,811 | 12/1973 | Smrekar et al. | 24/122.6 |
| 3,829,937 | 8/1974 | Metzler | 24/122.6 |
| 3,858,992 | 1/1975 | Eucker | 403/275 X |
| 4,127,741 | 11/1978 | Bauer et al. | 403/268 X |
| 4,174,463 | 11/1979 | Albert, Jr. | 174/79 |
| 4,189,620 | 2/1980 | Stange | 174/79 |
| 4,295,250 | 10/1981 | Dupuy | 403/275 |
| 4,346,954 | 8/1982 | Appling | 339/89 M |
| 4,360,288 | 11/1982 | Rutledge, Jr. et al. | 403/275 X |
| 4,401,396 | 8/1983 | McKay | 403/268 X |

Primary Examiner—Cornelius J. Husar
Assistant Examiner—Todd G. Williams
Attorney, Agent, or Firm—Fay, Sharpe, Fagan, Minnich & McKee

[57] ABSTRACT

A termination for cables of the type having a central bundle of conductors surrounded by strength members includes a rigid sleeve closely surrounding the bundle of conductors beneath the strength members and a rigid housing surrounding the strength members outwardly of the sleeve. The strength members are encapsulated in a hardenable material to define an enlarged lug closely received between said sleeve and housing. The housing and lug have cooperating cam surfaces for compressing the lug between the housing and sleeve when a pulling force is applied to the housing. The outer diameter of the housing is cylindrical and has a diameter approximately the same as the diameter of the cable outer cover.

12 Claims, 5 Drawing Figures

CABLE TERMINATION

BACKGROUND OF THE INVENTION

This application relates to the art of cable terminations and, more particularly, to terminations for cables or ropes of the type having a layer of tensile strength members surrounding a central core. The invention is particularly applicable for use with neutrally buoyant electro-mechanical cables and will be described with specific reference thereto. However, it will be appreciated that the termination of the present application has broader aspects, and can be used with many other types of cable or rope.

Cable terminations and joints frequently cause difficulty when the cable is passed over fittings such as sheaves or fairleads, or is wound on a cable storage drum. The termination or joint will frequently snag on such fittings or cause uneven coiling on a storage drum. Also, existing terminations make it difficult to insure that pulling forces are applied exclusively to the tensile strength members of the cable instead of to the central core of conductors.

SUMMARY OF THE INVENTION

A cable termination constructed in accordance with the present application is particularly adapted for use with a cable of the type including a central bundle of conductors surrounded by a layer of tensile strength members. The termination includes a rigid housing surrounding the strength members in outwardly spaced relationship thereto to define a cavity. End portions of the strength members within the cavity are substantially encapsulated in a hardenable material to form a lug closely received in the cavity. Cooperating cam surface means between the enlarged lug and the inner surface of the housing provide inward compression of the enlarged lug when the cable and housing are pulled in opposite directions.

In a preferred embodiment, a rigid sleeve closely surrounds the central bundle of conductors beneath the strength members, and the cavity for the lug is defined between the outer surface of the sleeve and the inner surface of the housing. The lug is then compressed between the housing and sleeve so that the bundle of conductors is isolated from compressive or pulling forces.

At least the inner surface of the housing is coated with a release agent so the lug is unbonded thereto. This provides free sliding movement between the cooperating cam surface means and optimizes inward compression of the lug to develop maximum holding strength on the tensile strength members to prevent pulling of same from within the termination.

The sleeve which surrounds the bundle of conductors is preferably tapered in a direction from its inner end toward its outer end. This facilitates installation of the sleeve over the bundle of conductors beneath the strength members, and causes the strength members to smoothly flare or taper outwardly into the lug.

The inner surface of the housing is preferably constructed with a plurality of longitudinally spaced cam surfaces which cooperate with corresponding cam surfaces on the lug. In addition, the central passage through the housing has a smaller diameter at its inner end that at its outer end. The outer end portion of the housing is provided with attaching means for attaching same to another member or device. In one arrangement, the attaching means takes the form of internal threads on the outer end of the housing for threadably receiving an adapter to which a ball retainer is connected. Balls swaged onto the tension members are trapped by the ball retainer for connecting the housing to another device.

The outer diameter of the cylindrical housing is approximately the same as the outer diameter of the cover surrounding the cable, and the length of the housing is preferably no greater than three times the diameter of the outer cable cover. The outer cover of the cable may include a layer of buoyant material surrounding the strength members, and the buoyant material, in turn, is surrounded by an abrasion resistant jacket. The outer cover, including the buoyant layer and the outer jacket, are cut-away from an end portion of the cable for installation of the termination. When the tensile strength members are braided or coiled, their end portions are preferably combed or otherwise straightened so they will readily flare outwardly around the sleeve into the cavity, and will be thoroughly impregnated and encapsulated by the hardenable material.

The housing for the termination may have one or more lateral holes or openings adjacent its inner end. These holes accommodate injecting the hardenable material into the cavity when the end portions of the tensile strength members are positioned therein.

The subject invention provides an improved termination for use with cables of the type including a central bundle of strands surrounded by a layer of tensile strength members.

The invention also provides such a termination which has a very small diameter and length.

An additional benefit of the invention resides in the provision of such a termination which eliminates or minimizes any damaging forces on the central bundle of strands.

Yet a further benefit of the invention is the provision of a termination which is easily connected to another device.

Still other benefits and advantages of the invention will become apparent to those skilled in the art upon a reading and understanding of the following detailed written description.

BRIEF DESCRIPTION OF THE DRAWINGS

The invention may take form in certain parts and arrangements of parts, a preferred embodiment of which will be described in detail and illustrated in the accompanying drawings which form a part hereof and wherein.

DETAILED DESCRIPTION OF A PREFERRED EMBODIMENT

Figure 1:
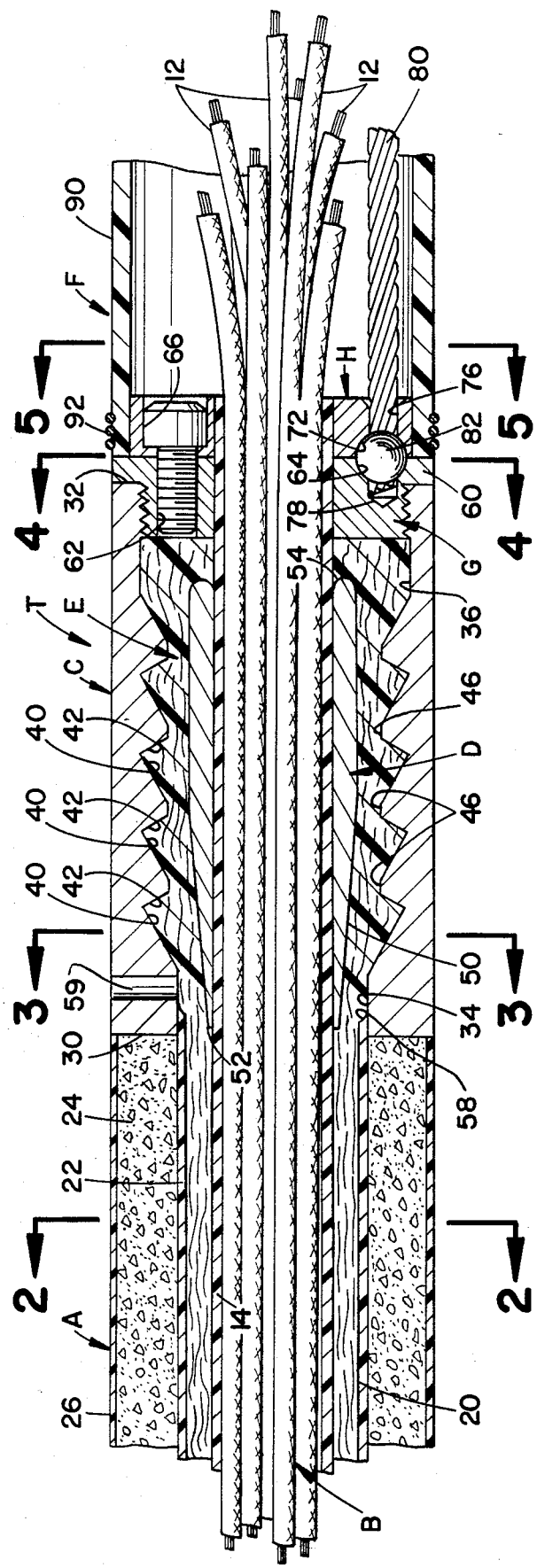
FIG. 1 is a side cross-sectional elevational view of a cable termination constructed in accordance with the present application.
Figure 2:
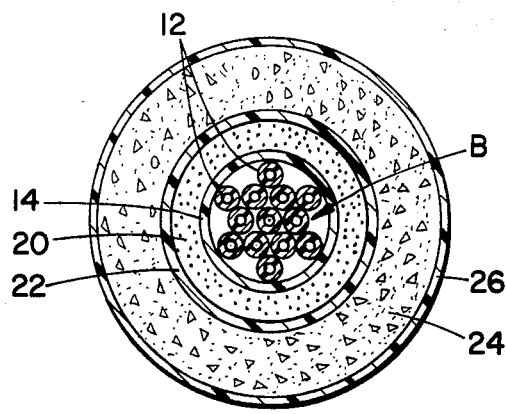
FIG. 2 is a cross-sectional elevational view taken along lines 2—2 of FIG. 1.

Referring now to the drawings, wherein the showings are for purposes of illustrating a preferred embodiment of the invention only and not for purposes of limiting same, FIG. 1 shows an elongated generally cylindrical and flexible linear body A in the form of an electro-mechanical cable having central core defined by a bundle B of strands 12. When linear body A comprises an electro-mechanical cable, each strand 12 comprises a metallic conductor individually surrounded by dielectric insulation. However, it will be recognized that individual strands 12 may also comprise optical fibers, and may even be other types of fibers or wires when linear body A is to be used for different purposes.

Central strand bundle B is commonly wrapped with dielectric tape which, in turn, is covered by a flexible plastic or elastomeric bundle jacket, and such jacket, in turn, is commonly wrapped in dielectric tape. All three layers are generally indicated in FIG. 1 by numeral 14 to designate a strand bundle cover.

Closely surrounding strand bundle cover 14 is a layer 20 of tensile strength members which may take many forms. In one preferred arrangement, the individual tensile strength members making up layer 20 are of aramid fibers. However, it will be appreciated that other types of synthetic fibers may also be used. In addition, it is possible to use natural fibers or metallic members for strength layer 20. The individual fibers or members which form strength layer 20 may be woven, straight or spiraled. The tensile strength members forming strength layer 20 are intended to take the entire pulling force on cable A so that central bundle strands 12 are protected against mechanical failure.

It is common to wrap strength layers with dielectric tape which, in turn, is covered by a jacket of plastic or elastomeric material, and such jacket, in turn, is wrapped with dielectric tape. These three layers are all generally indicated by numeral 22 in FIG. 1 to designate a strength layer cover.

A buoyant layer 24 surrounds strength layer cover 22 and may be of any suitable materials, including filled or foamed plastic or elastomeric material. The buoyant layer is intended to make cable A neutrally buoyant. Buoyant layer 24 is, in turn, closely surrounded by an outer abrasion resistant jacket 26 of plastic or elastomeric material. Buoyant layer 24 and jacket 26 together define an outer cover for cable A, and layer 22 may also be considered to form part of the outer cover for the cable outwardly of strength layer 20.

A cable termination T includes an outer cylindrical housing C having an outer diameter which is approximately the same as the outer diameter of cable A. Housing C has an inner end portion 30 and opposite outer end portion 32. A central passage through housing C includes a small diameter inner end portion 34 and a substantially larger diameter outer end portion 36. Small diameter passage end portion 34 has a diameter approximately the same as the outer diameter of strength member cover 22. The length of termination housing C is not greater than approximately three times the diameter of cable A. With the diameter and length of housing C related to the cable diameter as described, there is no problem with passage of the cable and termination around sheaves or fairleads, or with coiling and uncoiling of the cable with respect to a storage drum.

Cam surface means is provided on the inner surface of housing C in the form of a plurality of longitudinally spaced cam surfaces 40 which slope outwardly from the longitudinal axis of housing C in a direction from inner end portion 30 toward outer end portion 32 at an included angle of approximately 30°. Circumferential cam surfaces 40 are intersected by circumferential reversely sloped surfaces 42 which slope outwardly away from the longitudinal axis of housing C in a direction from outer end portion 32 toward inner end portion 30 at an included angle of approximately 60°. Thus, the length of circumferential cam surfaces 40 is substantially greater than the length of reversely sloped surfaces 42. A cylindrical flat 46 is provided between each adjacent cam surface 40 and the next reversely sloped surface 42. The diameter of each cylindrical flat 46 is somewhat larger than small diameter passage end portion 32 while being somewhat smaller than large diameter passage end portion 36. Cylindrical flats 46 define intersections between adjacent cam and reversely sloped surfaces which are closest to the longitudinal axis of housing C.

A rigid sleeve D is closely received over strand bundle cover 14 beneath strength members layers 20, and includes an outer tapered surface portion 50 which slowly tapers outwardly in a direction from sleeve inner end 52 toward sleeve outer end 54. Tapered surface portion 50 is tapered at a very shallow angle and extends over approximately one-half the total length of sleeve D. Also, sleeve D has a length which is less than the length of rigid housing C. The remainder of the outer surface of sleeve D is cylindrical as is the entire central passage therethrough, and sleeve outer end 54 is smoothly rounded.

In applying termination T to a cable, the outer cover of the cable as defined by layers 22, 24, and 26 is cut-away over a sufficient length so that strands 12 will extend completely through rigid housing C for connection to another device. In a preferred arrangement, a greater length of buoyant layer 24 and outer jacket 26 are cut-away than strength layer cover 22 so that a cylindrical terminal end portion 58 of strength layer cover 22 extends axially beyond buoyant layer 24 and outer jacket 26 as shown in FIG. 1. The terminal end portions of the tensile strength members forming strength layer 20 are then combed or otherwise unraveled or straightened so they can be thoroughly impregnated and encapsulated within a hardenable material.

Sleeve D is then moved axially over strand bundle B and its cover 14 beneath strength layer 20 to the position shown in FIG. 1. Housing C is moved axially over the terminal end portions of the strength members to the position shown in FIG. 1. The inner surface of housing C is spaced outwardly from the outer surface of sleeve D a distance greater than the radial thickness of strength layer 20 to define a cavity generally indicated by letter E in FIG. 1. The terminal end portions of the tensile strength members are distributed throughout cavity E and flare outwardly around tapered portion 50 of sleeve D. Terminal end 58 of strength layer cover 22 extends into small diameter portion 34 of housing C to protect the individual strength members against being cut or abraded against the edge of housing C when the cable is flexed.

Figure 3:
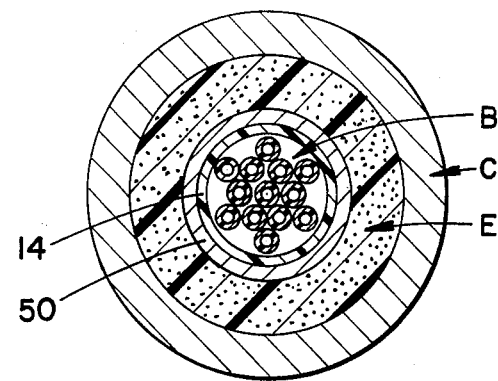
FIG. 3 is a cross-sectional elevational view taken along lines 3—3 of FIG. 1.
Figure 4:
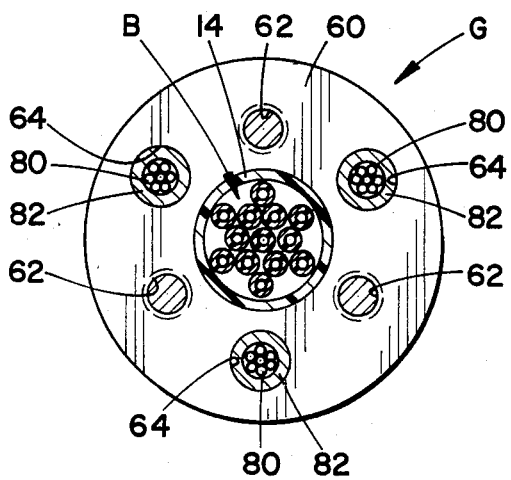
FIG. 4 is a cross-sectional elevational view taken along lines 4—4 of FIG. 1; and, FIG. 5 is a cross-sectional elevational view taken along lines 5—5 of FIG. 1.

Housing C has one or more radial holes or openings 59 therethrough adjacent inner end portion 30 thereof intersecting cavity E so that a hardenable material (denoted by a plurality of dots in cavity E in FIGS. 1 and 3) may be injected therethrough into cavity E for thoroughly impregnating and encapsulating the terminal end portions of the tensile strength members positioned therein. During injection of the hardenable material, an internally threaded large diameter passage end portion 36 may have a plug threaded therein to protect the threads, and one or more radial holes may intersect cavity E adjacent such plug so that when the hardenable material flows out the exit holes, it will be apparent that the cavity is filled. The terminal end portions of the strength members are trimmed to a desired length so their terminal ends will be located within housing C in spaced relationship from the outer end thereof before cavity E is filled with hardenable material.

When the hardenable material is solidified, an enlarged lug is formed on the terminal end portions of the strength members, and such lug is closely received in cavity E. In fact, the cavity E in FIG. 1 may also be considered to refer to the enlarged lug on the terminal end portions of the strength members. Such lug will have circumferential cam surfaces corresponding to cam surfaces 40 for cooperation therewith. Thus, housing C and the enlarged lug have cooperating cam surface means thereon so that pulling on housing C to the right in FIG. 1 causes cooperation of the cam surface means. Such cooperation compresses the lug inwardly against rigid sleeve D to firmly hold the strength members within the cavity and prevent displacement of the lug from the housing. Depending upon the material used for the strength members, the hardenable material used to form the lug can be an epoxy, thermoplastic, thermosetting plastic, vulcanizable material, elastomeric material, or a low melting point metal or alloy. The hardenable material may also have metallic or fiber reinforcement mixed therein.

In order to facilitate relative sliding movement between the cooperating cam surfaces on the lug and the interior of the housing, it is preferable to coat at least all of the interior surface of housing C with a release agent before the hardenable material is injected into the cavity. The release agent used will depend upon the type of hardenable material and may include waxes, silicones, fluoroplastics, metallic stearates, polyethylene, and various proprietary chemical compounds. Thus, the lug is unbonded to the interior surface of housing C and maximum compressive force is developed on the lug before longitudinal shearing will occur.

Internally threaded large diameter passage end portion 36 of housing C defines attaching means for attaching the termination and housing to another device or member. By way of example, termination T may be connected with a hydrophone array F or the like to which conductor strands 12 are suitably connected. An adapter G has external threads and is threadably received within the internal threads at large diameter end 36 of housing C. Adapter G has an outwardly extending circular flange 60 with an outer diameter approximately the same as the outer diameter of housing C. Adapter G has a plurality of circumferentially spaced tapped bores 62 therein and a plurality of circumferentially spaced semi-spherical recesses 64.

Figure 5:
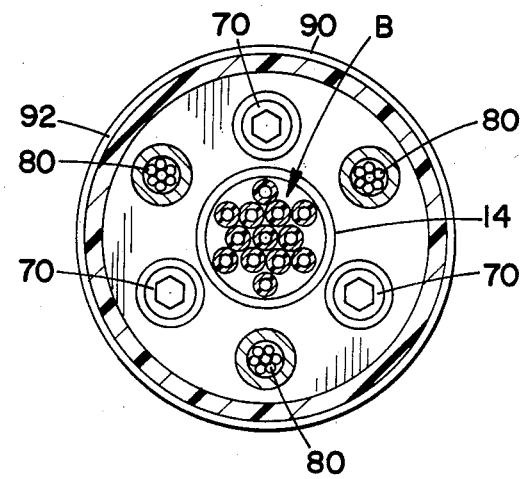

A ball retainer H has an outer diameter somewhat smaller than the outer diameter of housing C, and has a plurality of circumferentially spaced countersunk holes 66 therethrough for receiving headed bolts 70 (FIG. 5) to hold ball retainer H to adapter G. It will be recognized that the countersunk holes in ball retainer H are in alignment with the tapped bores in adapter G. Ball retainer H has a plurality of circumferentially spaced semi-spherical recesses in the face thereof which face toward adapter G, and only one of such recesses is indicated at 72 in FIG. 1. The spacing of the semi-spherical recesses in adapter G and retainer H is such that the recesses are aligned with one another. Axial holes 76 extend through ball retainer H in central alignment with semi-spherical recesses 72 therein, and an axial bore 78 extends beyond each semi-spherical recess 64 in adapter G. Tension members such as small cables 80 or the like have their end portions extended through ball retainer axial holes 76 before ball retainer H is assembled to adapter G. Balls 82 are then swaged onto the end portions of tension members 80 for close reception within the spherical recesses defined by the cooperating semi-spherical recesses 64, 72 between adapter G and retainer H. Ball retainer H is then positioned against adapter G, and bolts 70 are extended through countersunk holes 66 in retainer H and threaded into tapped bores 62 in adapter G.

An outer jacket 90 of plastic or elastomeric material has an outer diameter approximately the same as housing C, and an end portion thereof overlies retainer H. The radial thickness of jacket 90 is approximately the same as one-half the difference between the diameter of housing C and the outer diameter of retainer H. Serving wires 92 or other clamping means may be provided for radially clamping the end portion of jacket 90 over the outer surface of retainer H. Adapter G and retainer H have aligned central cylindrical holes therethrough with a diameter slightly larger than the diameter of strand bundle cover 14 for closely receiving same so that strands 12 extend continuously through termination T, adapter G, and retainer H into device F.

It will be recognized that sleeve D may be omitted in situations where the strands forming bundle B can withstand the compressive and pulling forces involved when the lug is compressed under a pulling force on housing C.

Although the invention has been shown and described with respect to a certain preferred embodiment, modifications and alterations will occur to others skilled in the art upon a reading and understanding of this specification. It is intended to include all such modifications and alterations insofar as they come within the scope of the claims or the equivalents thereof.

Having thus described the invention, it is now claimed:

1. A termination for a cable or the like of the type including an inner bundle of conductor strands circumferentially surrounded by tensile strength members and an outer covering overlying the tensile strength members, said termination including:
   a housing surrounding end portions of said strength members and having an inner housing surface spaced outwardly from said bundle of conductor strands a distance substantially greater than the radial thickness of said tensile strength members to define a cavity, said housing have an outer diameter approximately the same as the outer diameter of the covering, said end portions of said tensile strength members being substantially impregnated and encapsulated in a hardenable material to define an enlarged lug closely received in said cavity, and cam surface means carried on the inner surface of said housing for compressing said lug and preventing separation of said lug and housing when they are pulled in opposite directions.

2. The termination as defined in claim 1 including a rigid sleeve closely surrounding said bundle of conductor strands beneath said end portions of said tensile strength members, said cavity being defined between said sleeve and said inner surface of said housing, and said lug being compressed between said housing and sleeve when said lug and housing are pulled in opposite directions.

3. The termination as defined in claim 2 wherein said sleeve has inner and outer ends and includes a tapered outer surface portion which slopes outwardly from said inner end toward said outer end.

4. The termination as defined in claim 1 wherein said cooperating cam means comprises a plurality of longitudinally spaced circumferential cam surfaces.

5. The termination as defined in claim 1 wherein said housing has a length which is not greater than approximately three times said predetermined diameter.

6. The termination as defined in claim 1 wherein said lug and housing are unbonded to one another for providing free relative sliding movement between said cam surface means.

7. The termination as defined in claim 1, wherein said cover surrounding said tensile strength member includes a layer of buoyant material.

8. The termination as defined in claim 1 including a ball retainer attached to an outer end portion of said housing.

9. The termination as defined in claim 8 wherein said outer end portion of said housing is internally threaded and threadably receives an adapter, and said ball retainer being secured to said adapter.

10. The termination as defined in claim 9 including a plurality of tension members having balls secured to end portions thereof with said balls being retained in said ball retainer.

11. A termination for elongated flexible linear bodies of the type having a central bundle of conductor strands surrounded by tensile strength members which are surrounded by an outer covering, said termination comprising:
a generally cylindrical housing having an outer diameter approximately the same as the outer diameter of said covering and having internal cam surface means for cooperatin with lug means received in said housing, said outer covering being removed from an end portion of said linear body to expose free end portions of said tensile strength members, and said free end portions of said tensile strength members being impregnated and encapsulated in hardenable material to form a lug received in said housing in close fitting relationship with said cam surface means, whereby relative longitudinal movement between said housing and lug in a direction tending to pull said housing off said lug causes generally radial compression of said lug by action of said cam surface means.

12. The termination as defined in claim 11 including a rigid sleeve closely received over said bundle of strands beneath said tensile strength members, and said lug means being positioned between said housing and sleeve.

* * * * *